United States Patent [19]

Hermstein et al.

[11] 4,149,669
[45] Apr. 17, 1979

[54] READING AND RECORDING EQUIPMENT FOR CARDS WITH A MAGNETIC DATA CARRIER

[75] Inventors: Wolfgang Hermstein, Nüremberg; Günther Schertel, Lauf; Hans P. Latussek, Feucht, all of Fed. Rep. of Germany

[73] Assignee: Siemens Aktiengesellschaft, Munich, Fed. Rep. of Germany

[21] Appl. No.: 807,730

[22] Filed: Jun. 17, 1977

[30] Foreign Application Priority Data

Jun. 25, 1976 [DE] Fed. Rep. of Germany ....... 2628494

[51] Int. Cl.² ...................... G06K 13/20; G06K 7/08; G11B 21/16
[52] U.S. Cl. .................................. 235/482; 235/449; 360/104
[58] Field of Search ..................... 360/104, 109, 88, 2; 235/61.11 D, 61.11 R, 475, 482, 449, 450

[56] References Cited

U.S. PATENT DOCUMENTS

| | | |
|---|---|---|
| 3,685,836 | 8/1972 | Chernowitz ............................ 360/2 |
| 3,731,062 | 5/1973 | Reilly, Jr. ............................... 360/2 |
| 3,922,530 | 11/1975 | Zupancic ...................... 235/61.11 D |
| 3,939,327 | 2/1976 | Humphrey .................... 235/61.11 E |
| 4,040,097 | 8/1977 | Mizuno .................................... 360/2 |

Primary Examiner—Daryl W. Cook
Attorney, Agent, or Firm—Kenyon & Kenyon, Reilly, Carr & Chapin

[57] ABSTRACT

Reading and recording apparatus for cards having at least one magnetic track in which the card is held stationary and a magnetic head suspended in gimbals is utilized to read or write upon the card.

3 Claims, 6 Drawing Figures

READING AND RECORDING EQUIPMENT FOR CARDS WITH A MAGNETIC DATA CARRIER

BACKGROUND OF THE INVENTION

This invention relates to equipment for reading and recording information on cards having a magnetic track disposed thereon in general, and more particularly, to an improved type of equipment of this nature which is less susceptible to defects in the card.

Reading and recording equipment for reading or recording upon cards, such as conventional credit cards now in use, which contain thereon a magnetic strip, is known. Cards of this nature are used, for example, in banking transactions. These cards are also used for identifying purposes, for example, to permit access to secured areas.

In the equipment which is used with such cards, the cards are normally led past a reading head having one or more tracks by means of a transport device. Where a card with a magnetic data carrier is used, a particular danger exists that due to external influences such as dust, oil, geometric deformation of the card or the like, reliable reading and writing will not take place.

It is typical of most known equipment to transport the card by friction. A primary disadvantage of such a transport method is that, due to oil on the card, the transport through the reading head will not take place in a reliable manner so that information already existing thereon is not read correctly or that information which is to be recorded thereon is applied incorrectly.

One proposed solution to this problem is to accomplish the transport by using a movable carriage upon which the card is held fast. Although this overcomes the uncertainty associated with a friction drive, it is a poor solution because it is costly, requiring relatively complex mechanical means, particularly where large inertial forces occur because of a requirement for a short reading or writing time.

SUMMARY OF THE INVENTION

It is an object of the present invention to provide improved reading and recording equipment for cards with a magnetic data carrier which is of simple design and which is also capable of reading or writing on cards which have been damaged by external influences in a reliable manner. The reading and recording equipment according to the present invention is characterized by the feature that the card is held stationary and the magnetic head is suspended on a carriage in gimbals and the carriage moved past the magnetic data carrier on the card. In this manner, the air gap adapts itself well to any shape of the card surface and thus, the cards can be recorded upon and read without difficulty.

Normally the card will be inserted into the reader in the direction of the magnetic track. Often, however, inserting the card transversely to the magnetic track, i.e., with its long side ahead, is more advantageous. Among other factors, the handling is simpler and the dimensions of the equipment can be made smaller.

An important advantage of a stationary card with a moving magnetic head, particularly if the position of the card is transversal, is that the presently used cards which contain raised embossed information can also be provided with a magnetic track and can be processed along with cards without such embossing in the same equipment. With a card which remains stationary during processing and which is positioned transversely, it is furthermore an advantage that the magnetic head need be moved over the card only once during the reading or recording process. Because of this, the head can move in alternate directions, i.e., to the right and then to the left, when reading cards and need not be repositioned to read the next card. In this manner, the processing time or dwelling time of the card within the reader can practically be cut in half.

DETAILED DESCRIPTION OF THE PREFERRED EMBODIMENT

Figure 1:
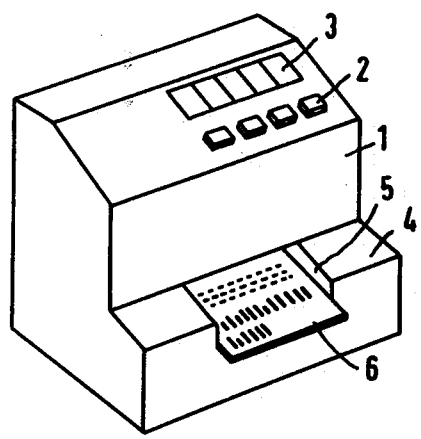
FIG. 1 is a perspective view of reading and recording equipment according to the present invention.

FIG. 1 shows a reading and recording apparatus of the type of the present invention in perspective view. The equipment includes a housing in which are provided, among other things, an illuminated keyboard 2 for entering various information and a light panel 3 for indicating various information. The general nature of such equipment is explained in somewhat more detail in co-pending application Ser. No. 807,729, now abandoned, filed on even date herewith and assigned to the same assignee as the present invention. The device disclosed in this co-pending application serves the same general purpose but is one which utilizes a transport drive for the card rather than for the magnetic head.

Figure 4:
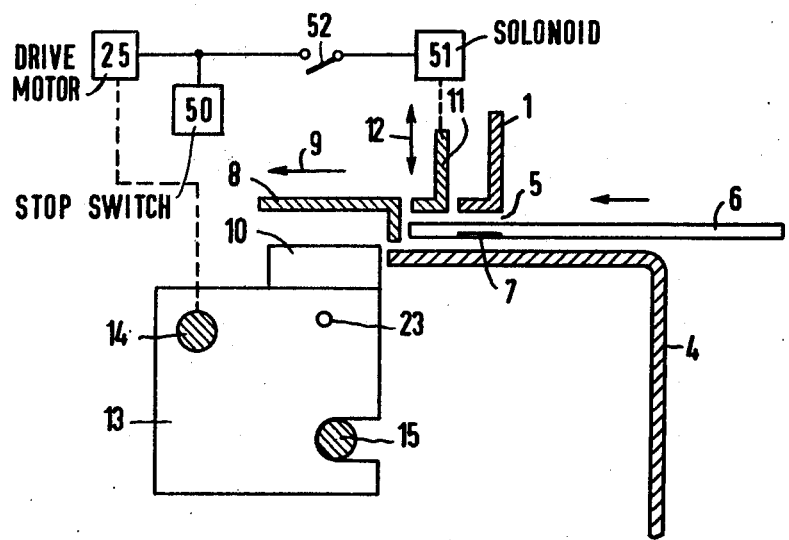
FIG. 4 is a cross section through a portion of the apparatus of FIG. 1.

In the base of the equipment 4 is an input opening 5 for insertion of the card 6 which is to be read or recorded upon. This opening is shown in cross section in FIG. 4. The card 6 contains a magnetic track 7 on which information is to be read or recorded. The track runs in the transverse direction of the card, i.e., in and out of the plane of the paper. When the card 6 is inserted, a reading gap cover 8 which covers the opening 5 is moved in the direction of the arrow 9 to the extent that the magnetic track 7 comes to lie directly above the track of a magnetic head 10. Suitably stop means are provided for the reading gap cover 8 so as to ensure proper positioning. This is illustrated schematically as a stop switch 50. When the stop switch 50 is activated, a signal is provided to a driving device 51 such as a solenoid which is mechanically coupled to a card depressor or a hold down 11. It is then caused to move in the direction of arrow 12 downward to hold the card in place during reading. In this manner, a heavily deformed plastic or paper card is held flat so that the reading gap remains constant. Thus, when the card 6 is inserted, the gap cover 8 is moved to activate the stop switch 50 which in turn actuates the card depressor 11. The output of the switch 50 can also be used to activate the drive motor 25 which is coupled to a drive spindle 14, for example, in a manner to be described below. Operation of the motor 25 causes the magnetic head to move and guides it along the magnetic track 7. Because the head and not the card 6 is moved, the magnetic head is not accessible through the opening 5 when no card is inserted so that a manipulation thereof to falsify an input is impossible. The head is therefore in the area where the card is inserted, i.e., in the vicinity of the card only during the active time.

A switch 52 is shown interposed between the stop switch 50 and the solonoid 51, which may be one of the switches 2 of FIG. 1, to permit releasing the card after reading. Such may also be accomplished automatically if the equipment 1 includes appropriate computing means. As noted above, the drive motor can be caused to drive back and forth when reading tracks on successive cards. This may be done by means of computer control or, such reversing may be accomplished simply by means of well known reversing circuits operated by limit switches located at each end of travel of the card.

Figure 2:
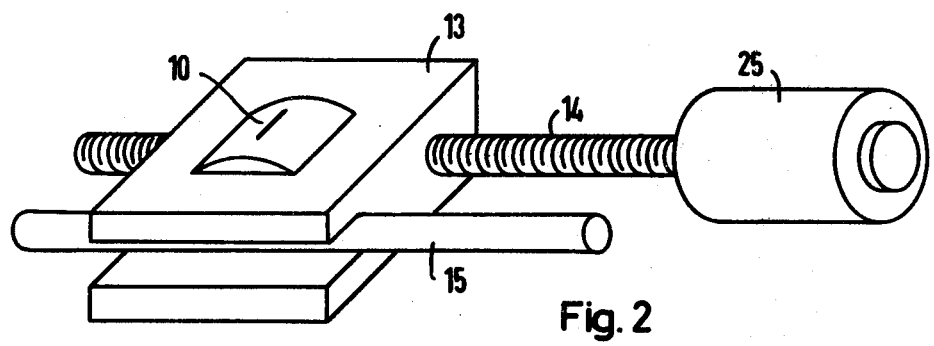
FIG. 2 illustrates a first drive means in the form of a threaded spindle for driving the recording head of the present invention.

As shown by FIG. 2, the magnetic head 10 is mounted on a carriage 13 which is driven by means of a threaded spindle coupled to a motor 25. A guide shaft 15 is also provided for guiding the head 10, which as shown, is mounted in a properly threaded block 13.

Figure 3:
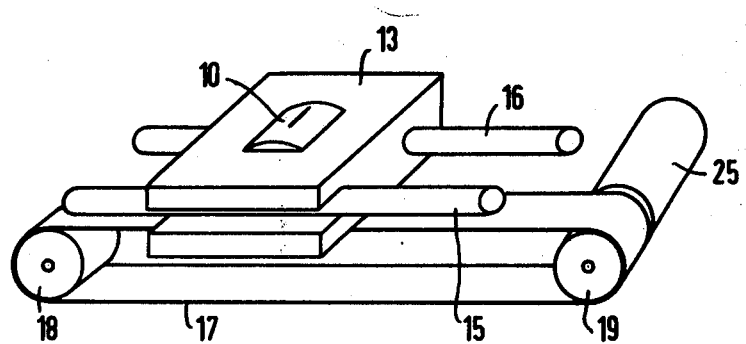
FIG. 3 illustrates a second driving means for the magnetic head in the form of a movable belt.

An alternate embodiment for moving the magnetic head is illustrated by FIG. 3. In this embodiment, the block 3 is attached to a rotating belt 17 which is driven by a roller 19 on the end of motor 25 and loops around another roller 18. In this embodiment, the spindle 14 is replaced by a guide rod 16.

The carriage 13 can be operated by other means such as by a linkage designed so as to cause the magnetic head to execute a rectilinear motion above the magnetic track. Furthermore, a rack or linear motor such as that disclosed in the aforementioned co-pending application for transporting a card, may also be used.

In the illustrated embodiment, the card to be read or to be recorded upon is inserted into the gap horizontally. The card can also be inserted in a gap arranged so as to be vertical or may be inserted so that the card is rotated 90° from the position shown in FIG. 1. In either case, an appropriate motion of the reading head with respect to the track can be accomplished using drive mechanism essentially the same as those discussed above in connection with FIGS. 2 and 3.

Figure 5:
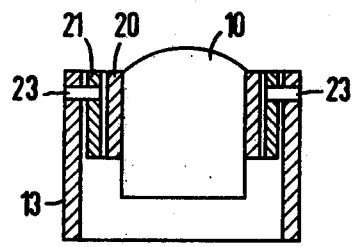
FIG. 5 is a cross sectional view through a gimballed magnetic head according to the present invention.
Figure 6:
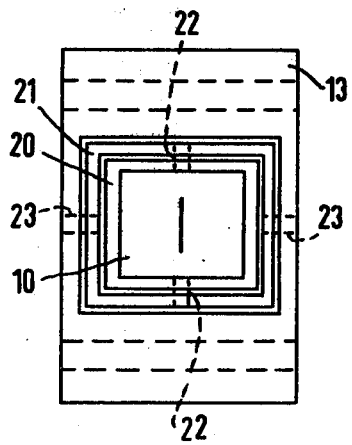
FIG. 6 is a plan view of the magnetic head of FIG. 5.

The manner in which the reading head 10 is supported in gimbals disposed within the support block 13 is shown on FIGS. 5 and 6. By suspending the magnetic head 10 in gimbals, cards which have been deformed by external influences can be processed without difficulty since the air gap can adapt itself to any card shape surface without difficulty. As shown, the reading head is supported within a mounting 20. The mounting 20 is gimballed by means of pins 22 visible on FIG. 6 to a frame 21 along a first axis. The frame 21 is itself gimballed to the support or carriage 13 by means of pins 23 along an axis perpendicular to the axis of the pins 22. Thus, a universal mobility of the magnetic head is provided.

We claim:

1. In reading or recording equipment for cards with a magnetic data carrier, the card being provided with at least one magnetic track, in which the card is inserted into the equipment and held fast and is read or recorded on by a magnetic head disposed within a movable carriage, the carriage adapted for movement over the magnetic track, the improvement comprising:
    (a) a slot into which said card is inserted for reading;
    (b) a linearly movable reading gap cover covering said slot and thereby protecting the magnetic head when said equipment is not in use, said reading gap cover adapted to be engaged by the edge of a card which is pushed into said slot; and
    (c) a stop means for engaging a portion of said reading gap cover as it is pushed in and moves linearly as a card is pushed in, said stop and reading gap cover cooperating so as to establish a positioning of the magnetic data carrier on said card which is in alignment with said magnetic head.

2. Apparatus according to claim 1 and further including a hold down device responsive to insertion of a card into said equipment for holding said card in place during reading or recording.

3. Apparatus according to claim 2 and further including means responsive to said recording gap cover being pushed to a predetermined position corresponding to a position where said magnetic track is aligned with said magnetic head and thereupon providing an output and wherein said hold down device is responsive to said output to hold said card in place.

* * * * *